(12) United States Patent
Carpenter

(10) Patent No.: US 12,373,605 B2
(45) Date of Patent: Jul. 29, 2025

(54) SECURE HASHING OF LARGE DATA FILES TO VERIFY FILE IDENTITY

(71) Applicant: SOPHOS LIMITED, Abingdon (GB)

(72) Inventor: James Christopher Carpenter, Oxford (GB)

(73) Assignee: Sophos Limited, Abingdon (GB)

( * ) Notice: Subject to any disclaimer, the term of this patent is extended or adjusted under 35 U.S.C. 154(b) by 288 days.

(21) Appl. No.: 17/958,004

(22) Filed: Sep. 30, 2022

(65) Prior Publication Data

US 2024/0111904 A1 Apr. 4, 2024

(51) Int. Cl.
*G06F 21/64* (2013.01)
*G06F 21/60* (2013.01)
*H04L 9/32* (2006.01)

(52) U.S. Cl.
CPC ............ *G06F 21/64* (2013.01); *G06F 21/602* (2013.01); *H04L 9/3236* (2013.01)

(58) Field of Classification Search
None
See application file for complete search history.

(56) References Cited

U.S. PATENT DOCUMENTS

| | | | | |
|---|---|---|---|---|
| 9,146,950 | B1 * | 9/2015 | Cooley | G06F 21/56 |
| 9,838,494 | B1 * | 12/2017 | Tomasiewicz | G06F 16/9574 |
| 10,516,526 | B2 * | 12/2019 | Zheng | H04L 67/125 |
| 11,658,831 | B2 * | 5/2023 | Jacobs | H04L 9/50 |
| | | | | 713/193 |
| 2006/0136390 | A1 * | 6/2006 | Zhao | G06F 16/9014 |
| 2009/0037456 | A1 * | 2/2009 | Kirshenbaum | G06F 16/137 |
| | | | | 707/999.102 |
| 2016/0062843 | A1 * | 3/2016 | Li | G06F 16/10 |
| | | | | 707/646 |
| 2018/0343271 | A1 * | 11/2018 | Tenorio | G06F 16/285 |
| 2021/0374121 | A1 * | 12/2021 | Paul | H04L 9/0894 |

* cited by examiner

*Primary Examiner* — Philip J Chea
*Assistant Examiner* — Bin Qing Zheng
(74) *Attorney, Agent, or Firm* — IP Spring

(57) ABSTRACT

Secure hashing of large files to verify file identity. In some implementations, a method includes determining a size of a particular file received by an endpoint device, and searching for a record indexed in a data structure based on the size. In response to finding the record, a sequence of multiple records is accessed in the data structure. For each record of the sequence, a particular data portion is hashed that has a location in the particular file that corresponds to a location in the record to obtain a particular hash result. In response to the particular hash result matching a corresponding previous hash result stored in the record based on an associated data portion in an associated file, the particular file is determined to be the same as the associated file, and characteristics of the particular file are determined using file information for the associated file.

20 Claims, 6 Drawing Sheets

SECURE HASHING OF LARGE DATA FILES TO VERIFY FILE IDENTITY

TECHNICAL FIELD

Implementations relate generally to hashing of data files, and more particularly, but not exclusively, to methods, systems and computer readable media for securely hashing data files to verify file identity.

BACKGROUND

Devices that can access networks via wired or wireless connections have proliferated. Consequently, the variety of threats, devices, applications, and communication protocols has also increased. Implementing and maintaining effective network and/or device security in dynamic and rapidly changing network environments can be a challenge.

One aspect of maintaining network security includes checking the identity of files, e.g., verifying that a received file has the same data as when the file was previously received or processed, and thus has not been tampered with or otherwise changed, e.g., by/with malware or other security threats. To check identity of a received file, some systems check against a known hash value for the file. For example, a checksum hash value for a given file is a cryptographic representation of the file in its exact state, such that any change to the file will change the hash value. To obtain the hash value, the entire data of the file is hashed by a hash function and the resulting hash value is checked against the known hash value to verify its identity. However, it is expensive in processing and/or network resources to hash large amounts of data in files.

SUMMARY

In general, some implementations may include systems and methods to provide secure hashing of large files to verify file identity. In some implementations, a computer-implemented method includes determining, by one or more processors, a size of a particular file received by an endpoint device, and searching for a record indexed in a data structure based on the size of the particular file. The data structure is stored on the endpoint device. In response to finding the record indexed in the data structure, a sequence of records is accessed in the data structure, the sequence including multiple records starting from the record. For each respective record of the multiple records, a respective particular data portion is hashed that has a location in the particular file that corresponds to a location in the respective record to obtain a respective particular hash result; and it is determined whether the respective particular hash result matches a corresponding respective previous hash result stored in the respective record. The respective previous hash result is based on a respective associated data portion in an associated file. In response to determining that the respective particular hash results match the corresponding respective previous hash results of the multiple records, it is determined that the particular file is the same as the associated file; file information is obtained that is previously determined for the associated file, and one or more characteristics of the particular file are determined using the file information.

In some implementations, the method further comprises, in response to determining that a particular hash result in the sequence is different than the corresponding previous hash result, searching for another record indexed in the data structure based on the size of the particular file or based on a matched hash result in a previous record of the sequence. In some implementations, each subsequent record in the sequence after the record is indexed based on a respective previous hash result in a previous record of the sequence. In some implementations, hashing the respective particular data portion includes storing the respective particular hash result in a cache that is available for later hashes of the respective particular data portion. In some implementations, the location in the respective record is a location in the associated file that is randomly determined by the endpoint device when the associated file was obtained by the endpoint device.

In some implementations of the method, a total size of the respective particular data portions is less than the size of the particular file such that an amount of data in the particular file that is hashed is less than all data (the entire data) in the particular file. In some implementations, the sequence includes a predetermined number of records, wherein the predetermined number is configurable by the endpoint device. In some implementations, the sequence is based on a predetermined order of the multiple records in the data structure. In some implementations, the sequence is based on a randomly-determined order or arbitrary order of the multiple records in the data structure.

In some implementations, the method further includes combining the respective particular hash results to create a file reference for the particular file for use by processes executing on the endpoint device. In some implementations, determining the one or more characteristics of the particular file at the endpoint device includes determining a security status of the particular file that indicates whether the particular file is at least one of: malicious, potentially malicious, or benign.

In some implementations, the method further includes applying a threat detection process to the particular file, in response to not finding any record indexed in the data structure based on the size of the particular file or not finding any record in the data structure in which the respective particular hash result matches a corresponding respective previous hash result.

In some implementations, the method further includes, in response to not finding any record indexed in the data structure based on the size of the particular file or not finding any record in the data structure in which the respective particular hash result matches a corresponding respective previous hash result: creating a new record in the data structure, the new record being indexed based on the size of the particular file or based on the respective previous hash result in a previous record in the sequence previous to the new record; determining a new location of a new data portion in the particular file; hashing the new data portion to obtain a new hash result; and storing the new location and the new hash result in the new record. In some implementations, the method further includes: creating a predetermined number of additional records in the sequence at successive hierarchical levels of the data structure after the new record; determining, for each additional record, a different respective additional location of a respective additional data portion in the particular file; hashing, for each additional record, the respective additional data portion to obtain a respective additional hash result; and storing, in each additional record, the respective additional location and the respective additional hash result.

In some implementations, the data structure is encrypted for use only on the endpoint device. In some implementations, each particular data portion has a size, and further comprising determining the size of the respective particular data portions based on one or more characteristics of the endpoint device that stores the data structure. In some implementations, searching for the record is performed in response to the size of the particular file being greater than a threshold file size, and further comprising: in response to the size of the particular file being less than the threshold file size, hashing all data of the particular file to obtain a single hash result and comparing the single hash result to a single previous hash result for the associated file to determine if the particular file is the same as the associated file. In some implementations, the method further includes removing the sequence of multiple records from the data structure in response to a particular period of time having passed since the sequence was created or last used to determine that a received file is the same as previously-obtained file.

In some implementations, a device includes one or more hardware processors; and a memory coupled to the one or more hardware processors, with instructions stored thereon, that when executed by the one or more hardware processors, cause the one or more hardware processors to perform operations. The operations include determining a size of a particular file received by the device via a communication network and searching for a record indexed in a data structure based on the size of the particular file, the data structure stored on the device. In response to finding the record indexed in the data structure, the operations include accessing a sequence of records in the data structure, the sequence including multiple records starting from the record, and for each respective record of the multiple records, hashing a respective particular data portion that has a location in the particular file that corresponds to a location in the respective record to obtain a respective particular hash result; and determining whether the respective particular hash result matches a corresponding respective previous hash result stored in the respective record. The respective previous hash result is based on a respective associated data portion in an associated file. In response to determining that the respective particular hash results match the corresponding respective previous hash results of the multiple records, the operations include determining that the particular file is the same as the associated file, obtaining file information previously determined for the associated file, and determining one or more characteristics of the particular file at the device using the file information.

In some implementations of the device, the execution of the instructions cause the one or more hardware processors to perform operations further comprising: in response to determining that the respective particular hash result is different than the corresponding previous hash result, searching for another record indexed in the data structure based on the size of the particular file or based on a matched hash result in a previous record of the sequence; and applying a threat detection process to the particular file in response to not finding any record indexed in the data structure based on the size of the particular file or not finding any record in the data structure in which the respective particular hash result matches a corresponding respective previous hash result. In various implementations, the execution of the instructions cause the one or more hardware processors to perform operations further comprising features similar to those described above for the computer-implemented method.

In some implementations, a computer-readable medium with instructions stored thereon that, when executed by one or more processors, cause the one or more processors to perform operations similar to the computer-implemented method. In various implementations, the execution of the instructions cause the one or more hardware processors to perform operations further comprising features similar to those described above for the computer-implemented method.

DETAILED DESCRIPTION

Figure 1:
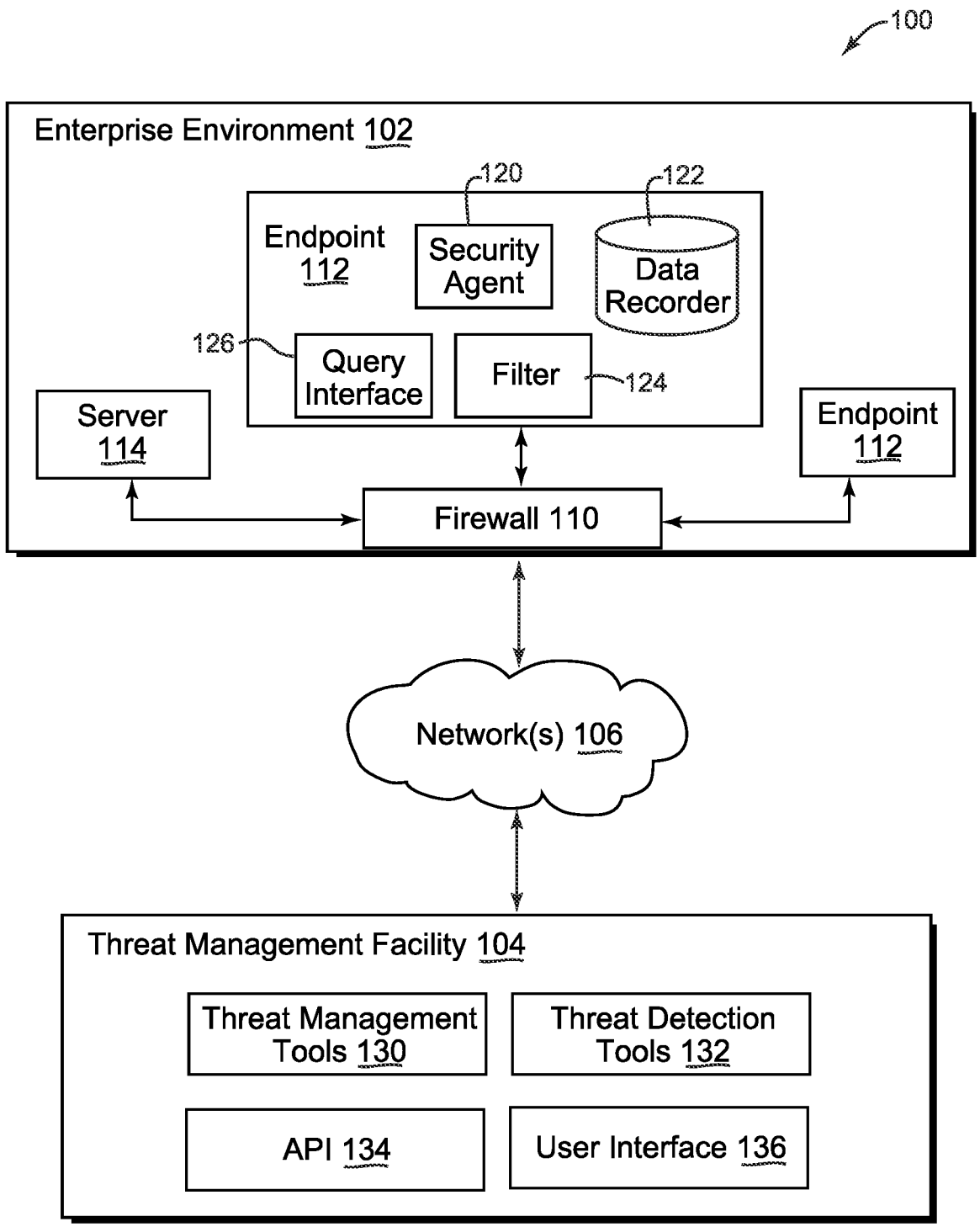
FIG. 1 is a diagram of an example network environment, in accordance with some implementations.

One or more implementations describe secure hashing of large data files to, for example, verify the identity of the files. In some implementations, a computer-implemented method can be performed on a device, such as an endpoint device connected to a communication network, and can include determining a size of a received current file, searching for a record indexed in a data structure based on the file size, and accessing a sequence of multiple records in the data structure. For each record, a data portion is hashed that has a location in the current file that corresponds to a location in the record, and it is determined if the hash result matches a previous hash result from an associated data portion in a previous file that was previously processed by the endpoint device. If the hash results match for a sequence of records, the current file is determined to be the same as the previous file such that its identity is verified. For example, such verification allows file information previously determined for the previous file to be used to characterize the current file (e.g., determine its security status) without having to process data of the current file again to determine that information.

Various other features are also described. For example, the hash results can be combined to create a file reference for the current file for use by processes on the endpoint device, and the file reference can be encrypted. The locations of data portions can be randomly determined by the endpoint device. If no record is associated with the file size of the current file and no record in the data structure has a previous hash result that matches the hash result, the current file is considered to not be the same as a previous file and has an unknown identity; for example, a threat detection process can be applied to the current file. In addition, new records can be created in the data structure to establish a sequence of records for the current file.

In additional features, the processing of the current file according to the above method is performed in response to the size of the current file being greater than a threshold file size. For files that have a size less than the threshold file size, the entire data of the file can be hashed to obtain a single hash result, which can be compared to a single previous hash result for the associated file to determine if the particular file is the same as the associated file.

Described features provide various advantages. It can be expensive in system resources to hash large files, especially files received over a network. Described features allow an endpoint device to securely and quickly hash only a portion of a data stream for a large file, without having to hash the entire contents of the file, thus saving significant processing and network resources. The data structure used for comparing hash results is built up as files (or portions thereof) are received and can be stored in a small amount of storage space on an endpoint device. Furthermore, described features allow a received file to be quickly compared to previously-received files, and if the identity of the file is verified to be the same as the previous file, allow use of information previously determined for the file, thus saving processing resources.

Furthermore, the described features are secured against threats or malicious actors. For example, the data structure, and filenames assigned to received files, are encrypted and thus securely stored on an endpoint device. The locations of data portions to be hashed are randomly determined and thus cannot be predicted. Furthermore, a particular sequence or path through the data structure of records defines the complete hash result for the file, such that if the locations of the data portions and hash results of those data portions become compromised, the particular sequence or path through the records may not be known and the file identity would not be compromised. In addition, the hashing process can be adjusted to provide more efficiency and/or security. For example, the threshold file size above which the described hashing features are used can be adjusted based on endpoint device characteristics and/or other factors, the size and/or number of data portions to be hashed can be adjusted, etc.

FIG. 1 is a block diagram of an example network environment 100 which can be used to enable secure hashing of files transmitted between elements a computer network, according to some implementations. In some implementations, network environment 100 include an enterprise environment 102 and a threat management facility 104 coupled via a network 106. In some implementations, network environment 100 can include other servers or devices not shown in FIG. 1.

The example enterprise environment 102 can include any networked computer-based infrastructure. For example, enterprise environment 102 can be corporate, commercial, organizational, educational, governmental, etc. As home networks can also include more computer instances at home and remotely (e.g., accessible via the cloud or internet), enterprise environment 102 can also or instead include a personal network such as home or a group of homes. The network of the enterprise environment 102 can be distributed among a plurality of physical premises such as buildings on a campus and can be located in one or in multiple geographical locations. The configuration of enterprise environment 102 is shown as one example, and there can be any number of compute instances, fewer or more of each type of compute instance, and other types of compute instances.

Enterprise environment 102 includes different types of computer systems. For example, as shown, enterprise environment 102 can include a firewall 110, one or more endpoints 112, and one or more servers 114.

Firewall 110 can be used to monitor and block or allow incoming and outgoing data traffic between other network devices and enterprise environment 102, and can be implemented in hardware and/or software. Other devices can also be included in enterprise environment 102, e.g., a wireless access point, etc.

One or more endpoints 112 can be connected to the enterprise environment 102. Each endpoint 112 can be any type of endpoint device or other compute instance described herein. Endpoint 112 can include, for example, any of an end-user computing device, mobile device, an appliance or Internet-of-Things (IoT) device, etc. An endpoint 112 can also or alternatively be a firewall, gateway, routers, and any other computing device or computing instance that can connect to the enterprise environment 102.

One or more of endpoints 102 can include a security agent 120 that locally supports threat management on endpoint 102, such as by monitoring for malicious activity, managing security components on endpoint 102, maintaining policy compliance, and communicating with threat management facility 104 to support threat security. Security agent 120 can, for example, coordinate instrumentation of the endpoint 102 to detect various event types involving various computing objects on the endpoint 102, and supervise logging of events in a data recorder 122. Security agent 120 can also or alternatively scan computing objects such as electronic communications or files, monitor behavior of computing objects such as executables, etc. Security agent 120 can, for example, apply signature-based or behavioral threat detection techniques, machine learning models, or any other tools or the like suitable for detecting malware or potential malware on endpoint 102.

Endpoint 102 can include data recorder 122, which can be a database or other data storage, and can be used to log events occurring on or related to the associated endpoint 102. Such logged events can include, for example, events associated with computing objects on endpoint 102, such as file manipulations, software installations, and so forth. Logged events can also include activities directed from endpoint 102, such as requests for content from Uniform Resource Locators (URLs) or other network activity involving remote resources. Data recorder 122 can record data at any frequency and any level of granularity consistent with proper operation of endpoint 102.

Endpoint 102 can include a filter 124 to manage of flow of information from data recorder 122 to a remote resource such as threat detection tools 132 of threat management facility 104. For example, a local agent on the endpoint 102, such as security agent 120, can filter the data stored on the data recorder 122 (e.g., data indicating events) and feed a filtered data stream to threat management facility 104. In this manner, a detailed log of events can be maintained locally on each endpoint, while network resources can be conserved for reporting of a filtered event stream that contains information believed to be most relevant to threat detection. Filter 124 can also or alternatively be configured to report causal information that causally relates collections of events to one another. Filter 124 can be configurable so that, for example, threat management facility 104 can increase or decrease the level of reporting based on a current security status of the endpoint, a group of endpoints, the enterprise environment 102, and other network components. The level of reporting can also or alternatively be based on currently available network and computing resources, or any other appropriate context.

In another aspect, endpoint 102 can include a query interface 126 to allow remote resources such as threat management facility 104 to query data recorder 122 for additional information. The query can include a request for specific events, activity for specific computing objects, or events over a specific time frame, or a combination of two or more of these. Thus, for example, threat management facility 104 can request all changes to the registry of system information for a particular period, e.g., for the past 48 hours, all files opened by system processes in the past day, all network connections or network communications within the past hour, or any other parameterized request for activities monitored by data recorder 122. In another aspect, the entire data log, or the entire log over some predetermined window of time, can be requested for further analysis at a remote resource.

In some implementations, enterprise environment 102 can also include one or more servers 114 that are connected to firewall 110 and endpoints 112. Server 114 can include one or more computing devices (e.g., a cloud computing system, a cloud computing instance, a rackmount server, a server computer, cluster of physical servers, virtual server, etc.).

Threat management facility 104 can detect, evaluate, and remediate threats or potential threats. Facility 104 can include one or more of a variety of threat management tools 130 to aid in the detection, evaluation, and remediation of these threats or potential threats. Threat management tools 130 can be used to manage or remediate threats to enterprise environment 102 that have been identified with threat detection tools 132 or otherwise. Threat management tools 130 can, for example, include tools for sandboxing, quarantining, removing, or otherwise remediating or managing malicious code or malicious activity. The threat management facility 100 can control access between the enterprise environment 102 and devices outside environment 102, and/or can control access to within enterprise environment 102 networks, e.g., restrict access to certain applications, networks, files, printers, servers, databases, and so on.

Threat management tools 130 can include functionality, for example, to scan applications, files, and data for malicious code, remove or quarantine applications and files, prevent certain actions, perform remedial actions, as well as other security measures. For example, tools 130 can scan an outgoing file and verify that the file is permitted to be transmitted according to policies. By checking outgoing files, threats can be discovered that were not detected in enterprise environment 102. Scanning may use any of a variety of techniques, including, without limitation, signatures, identities, classifiers, and other suitable scanning techniques. In some implementations, the scanning may include scanning some or all files on a periodic basis, scanning an application when the application is executed, scanning data transmitted to or from a device, scanning email and other communications, scanning in response to predetermined actions or combinations of actions, scan and so forth. The scanning of applications, files, and data may be performed to detect known or unknown malicious code or unwanted applications. Application behavior can also be analyzed before or as an application runs (e.g., monitoring code behavior, application programming interface calls made to libraries or to the operating system, monitoring activities such as, for example, reading and writing to memory, reading and writing to disk, network communication, process interaction etc.). Web security control can also be provided, e.g., reporting on suspect compute instances, security and content filtering, active monitoring of network traffic, Uniform Resource Identifier (URI) filtering, and the like. Network access control can also be provided, e.g., stop unauthorized, guest, or non-compliant systems from accessing networks, control access to virtual private networks (VPN), etc., as well as reputation filtering for known sources of malware. Aspects of the malicious code protection may be provided, for example, in the security agent 120 of endpoint 112, in a wireless access point, or firewall 110, as part of application protection provided by the cloud, and so on.

Policy management can also be provided by threat management facility 104 that manages rules or policies for the enterprise environment 102. For example, policies can include access permissions associated with networks, applications, compute instances, users, content, data, and the like, and can be stored using a database, a text file, other data store, or a combination thereof. Some examples of policies include a block list or allowed list can be used that identifies particular or types of network locations, applications, etc.; restricting particular activities (e.g., messaging or email) to particular endpoints under particular conditions; dynamic policies that can be adjusted based on contextual or other information; etc.

In some examples, threat management facility 104 can locally or globally tune filtering by local agents based on a current data stream, and can query local event data recorders for additional information where necessary or helpful in threat detection or forensic analysis. Threat management facility 104 can also or alternatively store and deploy a number of security tools, such as a web-based user interface that is supported by machine learning models to aid in the identification and assessment of potential threats by a human user. This can, for example, include machine learning analysis of new network traffic, models to provide human-readable context for evaluating potential threats, and any of the other tools or techniques described herein.

Threat management facility 104 can perform a range of threat management functions. In some implementations, facility 104 can include one or more threat detection tools 132, an application programming interface (API) 134 to interface with third party services from trusted security vendors, and a user interface 136 for access to threat management and network administration functions, and.

Threat detection tools 132 can include any tools for detecting threats or potential threats within a network such as network 106. Detection tools 132 can include, for example, network behavior analysis tools, machine learning models, etc. Threat detection tools 132 can use network traffic data caused by endpoints within the network, as well as any other available context (e.g., heartbeats) to detect malicious software or potentially unsafe conditions for a network or endpoints connected to the network. In some implementations, threat detection tools 132 can usefully network activity data from a number of endpoints (including, e.g., network components such as gateways, routers, and firewalls) for improved threat detection in the context of complex or distributed threats. Threat detection tools 132 can also or alternatively include tools for reporting to a separate modeling and analysis platform, e.g., to support further investigation of security issues, creation or refinement of security status detection models or algorithms, review, and analysis of security breaches, etc.

API 134 can provide a programmatic interface for customer or other third-party context, information, administration and security tools, and so forth. API 134 can also or alternatively provide a programmatic interface for hosted applications, identity provider integration tools or services, and so forth. In some examples, API 134 can support programmatic connections with third party services that facilitate exchange of data between threat management facility 104 and the third-party services. API 134 can, for example, connect to Active Directory or other customer information about files, data storage, identities and user profiles, roles, access privileges, and so forth.

User interface 136 can provide an interface for user interaction with threat management facility 104, e.g., for threat detection, network administration, audit, configuration, and so forth. For example, user interface 136 can include a web site or other graphical interface, or other interface. User interface 136 can facilitate curation of potential threats, e.g., by presenting threats along with other supplemental information, and providing controls for a user to dispose of such threats as desired, e.g., by permitting execution or access, by denying execution or access, or by engaging in remedial measures such as sandboxing, quarantining, vaccinating, and so forth.

Threat management facility 104 can include event detection and event logging facilities to detect and store collected events so that they can be accessed and analyzed. In some implementations, events collected in data recorder 122 of an endpoint 102 can be retrieved and stored by threat management facility 104.

When a threat or other policy violation is detected by threat management facility 104, remedial action may be taken by a remedial action facility of threat management facility 104. Such action can take a variety of forms, e.g., collecting additional data about the threat, terminating or modifying an ongoing process or interaction, sending a warning to a user or administrator, downloading a data file with commands, definitions, instructions, or the like to remediate the threat, requesting additional information from a device such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions.

In some implementations, threat management facility 104 can provide reputation filtering, which can target or identify sources of known malware. For instance, reputation filtering can include lists of URLs of known sources of malware or known suspicious IP addresses, code authors, code signers, or domains, that when detected may invoke an action by the threat management facility 104. Based on reputation, potential threat sources may be blocked, quarantined, restricted, monitored, or some combination of these, before an exchange of data can be made. Aspects of reputation filtering may be provided, for example, in the security agent of an endpoint 112, in firewall 110, wireless access point, as part of application protection provided by the cloud, and so on. In embodiments, some reputation information may be stored on a compute instance 112 or 114 and other reputation data available through cloud lookups to an application protection lookup database.

Threat management facility 104 can include a variety of additional facilities, such as a security management facility, update facility, definitions facility, network access rules facility, detection techniques facility, application protection facility, asset classification facility, entity model facility, analytics facility, dynamic policies facility, identity management facility, marketplace management facility, etc. It should be understood that the threat management facility 104 may be implemented in whole or in part on a number of different compute instances, with some parts of the threat management facility on different compute instances in different locations. For example, some or all of one or more of the various facilities may be provided as part of security agent 120 that is included in software running on an endpoint 112 within enterprise environment 102. Some or all of one or more of the facilities can be provided on the same physical hardware or logical resource as a gateway, such as a firewall 110 (or a wireless access point, etc.). Some or all of one or more of the facilities may be provided on one or more cloud servers or cloud computing instances that are operated by the enterprise or by a security service provider.

Threat management facility 104 (and/or security agent 120) can provide protection against a plurality of threats, such as malware, viruses, spyware, cryptoware, adware, Trojans, spam, intrusion, policy abuse, improper configuration, vulnerabilities, improper access, uncontrolled access, and more. Threat management facility 104 may communicate with, coordinate, and control operation of security functionality at different control points, layers, and levels within the network environment 100. In various implementations, the threat management facility 100 may provide protection from a variety of threats to a variety of compute instances in a variety of locations and network configurations.

As one example, users of the threat management facility 104 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 104 may provide many different services including policy management.

Network 106 can be any of various types of communication networks, including one or more of a public network (e.g., the Internet), a private network (e.g., a local area network (LAN) or wide area network (WAN)), a wired network (e.g., Ethernet network), a wireless network (e.g., an 802.11 network, a Wi-Fi® network or wireless LAN (WLAN)), a cellular network (e.g. a Long Term Evolution (LTE) network), routers, hubs, switches, server computers, or a combination thereof.

In some implementations, a third-party provider can make available one or more additional facilities to the enterprise environment 102 via the threat management facility 104, e.g., to provide additional functionality or capabilities to the threat management facility 104 and endpoints 112. The third-party provider can be a physical security event provider, a system provider, a specialized analytics provider, etc. The provider, with appropriate permissions and authorization, may receive and send events, observations, inferences, controls, convictions, policy violations, or other information to threat management facility 104. In some implementations, an identity provider can be connected to network 106, and can be any remote identity management system or the like configured to communicate with threat management facility 104. For example, the identity provider can confirm identity of a user, provide or receive other information about users that may be useful to protect against threats, create, maintain, and manage identity information for principals while providing authentication services to relying party applications in a network, offer user authentication as a service, and/or provide user identity information (e.g., such as multi-factor authentication), e.g., to a software-as-a-service (SaaS) application.

In some implementations, threat protection provided by the threat management facility 104 can extend beyond the network boundaries of the enterprise environment 102 to include clients (or client facilities) such as endpoints or other devices or computing instances outside the enterprise environment 102. In some implementations, endpoints 112 and/or other compute instances of network 106 may communicate with various servers outside enterprise environment 102, e.g., cloud applications, such as a SaaS application, which can be an application that is used by but not operated by the enterprise environment 102; or unprotected servers such as a web site or a third-party application through an internetwork such as the Internet or any other public network, private network or combination of these.

Endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network.

Some implementations can use any type of system or device to execute one or more methods described herein. Some implementations can provide features described herein on a device that is disconnected from or intermittently connected to computer networks and/or other devices.

Validating Identity of Large Files Using Secure Hashing

Figure 2:
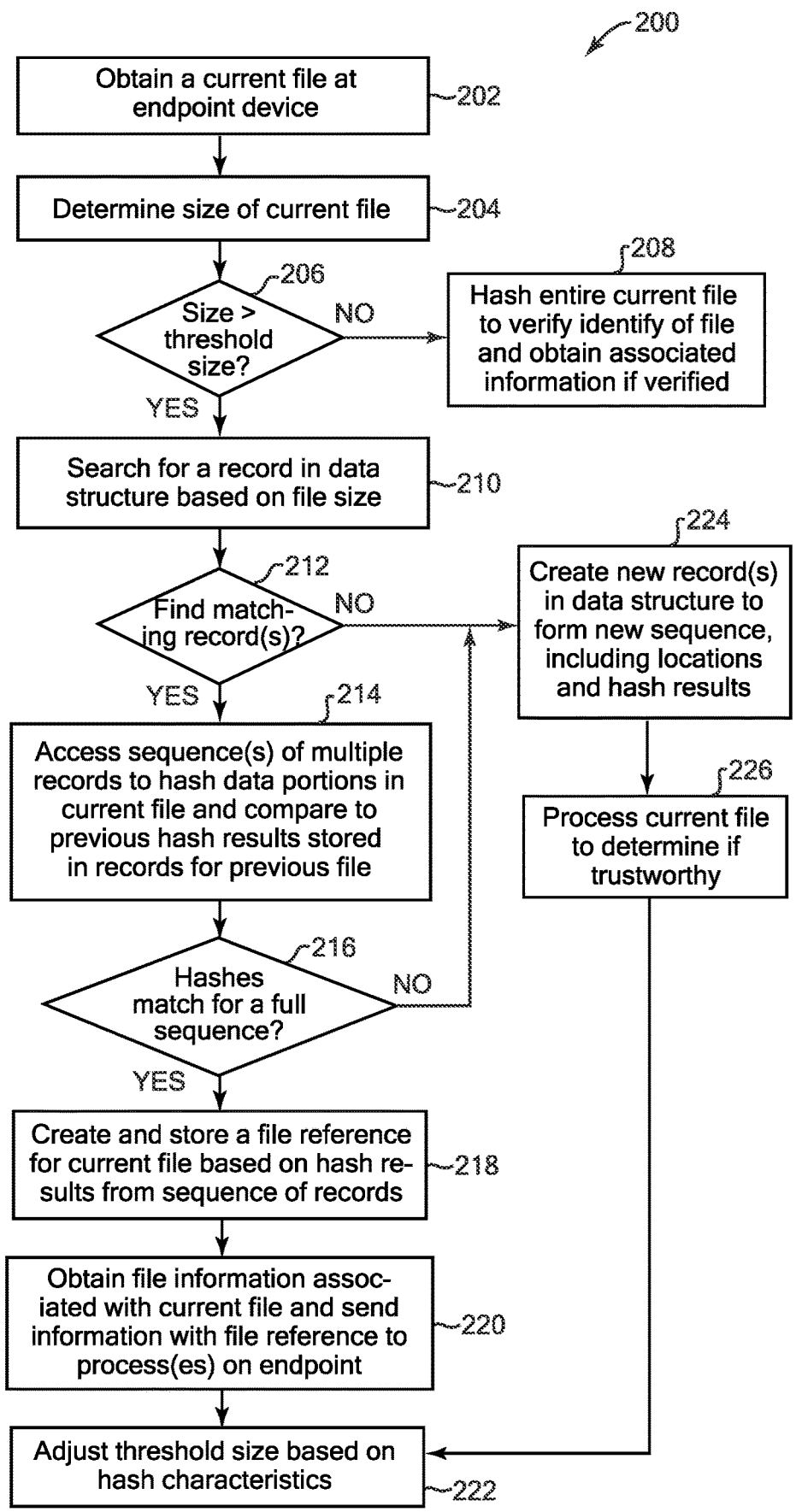
FIG. 2 is a flow diagram of an example method to securely hash large files and validate the identity of such files, in accordance with some implementations.

FIG. 2 is a flow diagram illustrating a method 200 to securely hash large files and validate the identity of such files. Method 200 can be implemented, for example, on an endpoint device coupled to a communications network, e.g., one or more endpoints 112 of FIG. 1. For example, in some implementations, method 200 can be performed by security agent software executing on the endpoint device. In some implementations, method 200 can be implemented on other devices of a network, e.g., a server, firewall device, wireless access point, or other device. In described examples, the implementing device includes one or more digital hardware processors or processing circuitry ("processors") and one or more storage devices. In some implementations, different components or facilities of a device can perform different blocks or other parts of the method 200.

In some implementations, method 200, or portions of the method, can be initiated automatically by a device, periodically performed and/or performed based on the occurrence of one or more particular events or conditions. For example, such events or conditions can include the device receiving a file. In other examples, such events or conditions can include a predetermined time period having expired since the last performance of method 200, and/or one or more other events or conditions occurring which can be specified in settings of the device implementing method 200. In some implementations, such conditions can be previously specified by a user in stored custom preferences of the user (accessible by a device or method with user consent).

Method 200 may begin at block 202. In block 202, a file (a "current file" as referred to herein) is obtained at an endpoint device (or other device that is implementing method 200, which is referred to as an "endpoint" or "endpoint device" herein for convenience). In some examples, the file may have been received by the endpoint device via a communications network, e.g., network 106 of FIG. 1, or from a different source. In some implementations, the file (or part of the file) was received by the endpoint device at an earlier time and has been stored (or part of it has been stored) by the endpoint device until it can be processed by method 200. Block 202 can be followed by block 204.

In block 204, a size of the current file is determined. The size can be determined, for example, from an operating system function or other function call, command, etc. In some implementations or cases, the size can be determined from metadata associated with the current file. Block 204 can be followed by block 206.

In block 206, it is determined whether the size of the current file is greater than a threshold size. The threshold size can be a file size that is a minimum size to cause the processing of a received file by hashing multiple portions of the file to obtain multiple hash results, as described below. Files above the threshold size can be considered sufficiently large to hash multiple portions and use multiple hash results. Files below the threshold size can be considered sufficiently small to use a different hashing process.

In various implementations, the threshold size can be determined in any of various ways. In some examples, the threshold size can be a default size. In some implementations, the threshold size can be zero, such that the size of the current file is always greater than the threshold size. In some implementations, the threshold size can be adjusted at least partially based on characteristics of the performance of method 200, as described below with respect to block 226. In some implementations, the threshold file size can be determined at least partially based on one or more characteristics of the endpoint device, a network over which files are obtained by the endpoint device, one or more storage devices of the endpoint device that store the data structure, the particular file, the associated file, and/or a time duration for performing a hash on the threshold file size. In some examples, threshold size can be based at least partially on whether the endpoint device is a server, router, or other type of device, network characteristics including network latency and/or bandwidth for the endpoint device, and/or a configuration input by a user based on various characteristics as described herein. In some examples, endpoint devices that have at least a threshold amount of system resources (e.g., one or more of processing capability, available storage space such as memory or other storage device, etc.) can be assigned a first threshold file size, and endpoint devices that have lower than that amount of system resources can be assigned a second threshold size that is different than the first threshold size. In some examples, endpoint devices that have a particular processing capability or speed may be able to process larger files more efficiently, and can be associated with a higher threshold size for method 200. In some implementations, the threshold size can be based on the size of data portions hashed in block 214 described below. For example, the threshold size can be larger if data portions of a first size are hashed (or data portions between a first range of sizes), and can be smaller if data portions of a second, smaller size are hashed (or data portions between a second range of sizes).

If the size of the current file is less than the threshold size, the method continues to block 208 such that hashing multiple different portions of the current file, e.g., according to features described below, is not performed. For example, in some implementations, in block 208 the entire data (all the data) of the current file is hashed and a single hash result is determined. In some implementations, the hash result can be used to verify an identity of the current file, e.g., that the current file is the same as a previous file that was previously processed by the endpoint device. For example, the hash result can be compared to a list or table of previous hash results stored by the endpoint device that were previously determined by hashing files previously obtained. Other techniques can also be used to verify the identity of the current file based on the hash result. In some implementations, a unique file reference is created for the current file, where the file reference includes the hash result. This file reference is provided to other processes executing on the endpoint device, e.g., similarly to blocks 222 and 224 described below.

In some examples, if a match to the single hash result is found in a table (or other data structure) of previous single hash results, the identity of the current file is verified, and stored/cached information associated with the current file is obtained and provided to one or more processes executing on the endpoint device, e.g., similarly to block 224 described below. In further examples, if no match to the hash result is found in the table, the identity of the current file is not verified. In such a case, in some implementations, the hash result is stored as a new entry in the table and the current file is processed by one or more threat detection processes (or other processes) of the endpoint device to determine if it is trustworthy, e.g., similarly to block 216 described below.

If the size of the current file is greater than the threshold size as determined in block 206, the method continues from block 206 to block 210, in which a record is searched for in a data structure stored on the endpoint device, where the search is based on the size of the current file as determined in block 204. For example, the data structure can include one or more trees or tables, where each tree or row of the table has an initial record that is indexed according to a file size. In some examples, a tree as described herein can be implemented as a table having rows of records, each row being a sequence of records (or multiple trees can be implemented as such a table). In block 210, the data structure can be searched for a record having an index file size that matches the file size of the current file. Block 210 can be followed by block 212.

In block 212, it is determined if one or more records are found in the data structure that match the file size of the current file. In some examples, some records in the data structure are indexed based on file sizes of previous files obtained and processed in method 200 by the endpoint device. In some implementations, these records can be initial records of a sequence of records. For example, each initial record can be the first level of a tree or table row(s) in the data structure, where each initial record is provided in a different tree or different row in a table. Other forms of data structure can be used in other implementations (e.g., graphs, etc.).

If one or more records matching the file size are found in the data structure in block 212, then the method continues to block 214, in which one or more sequences (e.g., path) of multiple records in the data structure are accessed in a search for a full sequence of records that match the current file. The records are accessed to determine locations of data portions in the current file and to compare hashes of the data portions to corresponding previous hash results stored in the records, where the previous hash results are results from hashing respective data portions of a previously-processed file ("previous file"). The full sequence of records includes an amount and/or sequence of records that, if matched to the current file, indicate that the current file is the same as the previous file. In some implementations, the sequence of records is accessed by traversing a tree or table row of the data structure. In some examples, the initial record accessed for a sequence of records can be a selected one of the matching records found in block 212 that are indexed based on the file size of the current file. In some implementations, multiple paths of records can be checked for matches, e.g., if a record does not match, one or more other records can be checked for a match.

For a full sequence, the total amount of data in the current file that is hashed is equal to a sum of the data portions that are hashed as determined by the number of records that are accessed in the full sequence. This is configured so that the data portions have a total (summed) size that is less than the size of the current file, e.g., less than the entire amount of data of the current file. In some cases or implementations, a significantly lower amount of data is hashed, e.g., less than 10% of the entire data or a lower percentage. In some implementations, the percentage can be at least partially based on the threshold size described above, and can be based on considerations of data security (e.g., more hashes) vs. speed of processing. Since a lower amount of data in the current file is hashed than the entire amount of data, hashing all the data in the current file is avoided, thus saving processing resources (especially if the current file is large, e.g., has a size greater than the threshold size). Block 214 can be followed by block 216.

In block 216, it is determined whether hash results of the current file determined in block 214 match the corresponding previous hash results stored in the data structure for a full sequence of records. If the current hash results do not match previous hash results for a full sequence of records, the method continues to block 224, described in greater detail below. If the current hash results match corresponding previous hash results, the method continues to block 218.

Some examples of implementation techniques for blocks 214 and 216, including accessing records, hashing data portions of the current file, and comparing to previous hash results, are described below with respect to FIG. 3.

In block 218, current hash results match the previous hash results for a full sequence of records as determined in block 216, and thus the current file is considered to be the same as the previous file and the identity of the current file is verified. A file reference for the current file is created and stored based on the current (or previous) hash results from the matching full sequence of records. In some implementations, the file reference can be a temporary filename for the current file. For example, the file reference can be made up of a concatenated form of the hash results in the full sequence of records, e.g., provided in an order of that sequence. This provides a unique file reference for the current file while the current file is being processed on the endpoint device. In some implementations, the filename is encrypted for use only on the endpoint device, e.g., encrypted with a symmetric key. Block 218 can be followed by block 220.

In block 220, stored file information is obtained that is associated with the previous file, and thus is associated with the current file. The file information can be sent to one or more other processes executing on the endpoint device to be used by those processes to determine one or more characteristics of the current file. The file information was previously determined based on previous processing of the previous file by the endpoint device (or obtained by the endpoint device from a different device) prior to obtaining the current file. In some implementations, the file information can be used by the other processes such that they can avoid having to process the current file to obtain that information, thus saving processing time and resources of the endpoint device.

For example, the file information can include, and/or can be used to determine, characteristics of the current file. Such characteristics can include, for example, the type of the current file (e.g., read-only, system file, data file, executable file, document file, image file, or other type of file). The characteristics can include a classification of content of the current file, e.g., to enable data loss prevention (DLP) or other data leakage prevention policies that classify data to determine appropriate security controls for safeguarding data in the file. Such classifications can include public, private, restricted, etc., and can be based on level of sensitivity, file format, one or more authors of the data in the file, the time of creation of the file, etc. The characteristics can include scan results from one or more previous malware scans of the current file, e.g., indicating potentially malicious data or portions of the current file. The characteristics can include a signing status of the current file, e.g., indicating whether the current file has been signed by an authority in the threat detection system. The characteristics can include reputation information that indicates a reputation of the current file (e.g., whether the current file is from known malicious sources or has other characteristics of known potentially malicious files). The characteristics can include machine learning results from one or more machine learning models that previously scanned or analyzed the current file, e.g., indicating malicious or potentially malicious characteristics, or other characteristics.

In some implementations, even though the identity of the current file is verified, the current file can still be considered untrustworthy until it is processed by the one or more other processes on the endpoint device based on the file information. For example, sub-engines can receive the file information and provide characteristics to an engine that makes a decision as to whether access should be allowed to the current file by processes executing on the endpoint device. In some implementations, other factors can cause the identified current file to be considered untrustworthy, e.g., changes to a machine learning engine that cause particular previous results or file information to be considered invalid. In some implementations, the file information can include information that is not related to threat detection such as viruses or other malware. that resulted from scanning the current file, e.g., information that indicates characteristics of the current file such as particular sensitive or private information included in the file (e.g., credit card records, user identity, personal data for a user, etc.), and/or that indicates that one or more particular processes on the endpoint device should not access the current file. In some implementations, the file information can include one or more of the hash results from records in the data structure which can be examined by some processes to determine threats to the endpoint device. Block 220 can be followed by block 222.

In block 222, the threshold file size used in block 206 can be adjusted based on hash characteristics of hashing performed in block 214, if appropriate. This threshold file size determines whether to perform the multiple hashes of block 214 or perform a different hash technique such as a single hash of the entire current file described for block 208. In some examples, this adjustment allow the execution of method 200 to be tuned to a particular hardware and/or software configuration. For example, one or more characteristics of the hashing process(es) used in block 214 can be determined and compared to thresholds or other reference characteristics. If one or more hash characteristic thresholds are exceeded, then the threshold file size used in block 206 can be adjusted for future performances of method 200.

In some examples, a self-tuning method can be used over multiple performances of method 200, e.g., in a pre-processing testing method that uses test files before processing actual files. For example, the time to process block 214 (or a portion thereof) on a test file can be measured in one iteration of method 200 using a default threshold file size. The test file is also hashed using one or more standard hash methods that, e.g., hash the entire file (as indicated in block 208) and the time to process is measured. The time to process is compared between the methods, and if the method of block 214 takes longer than the other method(s), the threshold file size can be increased so that the multiple hashes of block 214 are performed only for files larger than previously processed by that block. If the method of block 214 takes a shorter time than the standard method(s), the threshold file size can be decreased so that smaller files can be processed by block 214.

In another example, the threshold file size can be adjusted in one direction by a particular magnitude, the time to process block 214 measured, and the threshold file size adjusted based on whether the time to process has increased above a first time threshold (causing the threshold file size to be increased), or if the time to process has decreased below a second time threshold (causing the threshold file size to be decreased). In some implementations, a proportional derivative (PD) control method can be used to reduce or stop bounce between two thresholds and keep the threshold size stable.

Returning to blocks 212 and/or 216, if no matching record is found in the data structure based on the file size of the current file as indicated in block 212, or if there is no full sequence of matching records found in the data structure as indicated in block 216, then the method continues to block 224. In block 224, one or more new records are created in the data structure to form a new full sequence of records, where a respective data portion location and hash result is determined and stored in each new record. Since no matching file size record or full sequence of records was found, the current file was not previously processed by the endpoint device to provide such matching record(s), and so a new sequence of records is created in the data structure for the current file. Some examples of techniques to create new records in the data structure are described below with respect to FIGS. 4 and 5. Block 224 is followed by block 226.

In block 226, the current file is processed to determine its characteristics to determine if it is trustworthy. Since a matching file size record or full sequence of records was not found in the data structure, the current file is identified as not having been processed earlier to create records, and its identity is not verified and therefore has unknown characteristics and thus could be untrustworthy. Accordingly, the current file can be sent to one or more threat detection processes and/or other processes executing on the endpoint device (or to one or more other connected devices, e.g., threat management systems as described above) that can determine characteristics of the current file. The characteristics can be used to determine if the current file is trustworthy and whether or not to block the current file from being accessed by other processes on the endpoint device.

In some examples, a security agent executing on the endpoint can scan the file, calculate the file type, check for malware, classify file contents, check for file validation, check any signatures on the file, check for file reputation, check with machine learning for that file type, etc. In further examples, some processes (e.g., sub-scanners or sub engines) can scan the current file to determine that the current file contains particular sensitive or private information such as credit card records, user identity, personal data for a user, etc. and/or can indicate that one or more particular processes on the endpoint device should not access the current file. In some implementations, one or more of the hash results determined in block 214 can be used by a process that performs analysis to identify indicators of compromise on the endpoint device.

In some cases, access to the current file can be blocked on the endpoint device for one or more processes executing on the endpoint device based on processing the current file, and in some cases, access can be blocked even if the current file is determined to be benign by one or more processes.

In some implementations, results determined by the processes can be stored (e.g., cached) in a storage device (e.g., data recorder 122 or other database) so that these results can be retrieved, e.g., in future instances when the current file is again received and is verified as the same file (as in block 220 described above).

In some implementations, block 226 can be followed by block 222, in which the threshold file size used in block 206 can be adjusted, similarly as described above.

In some implementations of method 200, the data structure that stores hash results as described above can be maintained for efficiency. For example, the records in a full sequence can be removed from the data structure (trimmed) if a particular (e.g., threshold) amount of time has passed since that sequence was created or since the full sequence (e.g., all records of the sequence) was last matched to a received file having a verified identity. For example, each sequence can be associated with a time-to-live (TTL) attribute that is reset when the sequence is fully matched to a received file. In some examples, a non-monotonically incrementing counter can be associated with each sequence of records, e.g., a clock or other counter, which can be used to determine the time duration since the last match of the full sequence. The counters can be scanned periodically and the sequences of records that have the longest time duration since last match are the first to be removed.

Figure 3:
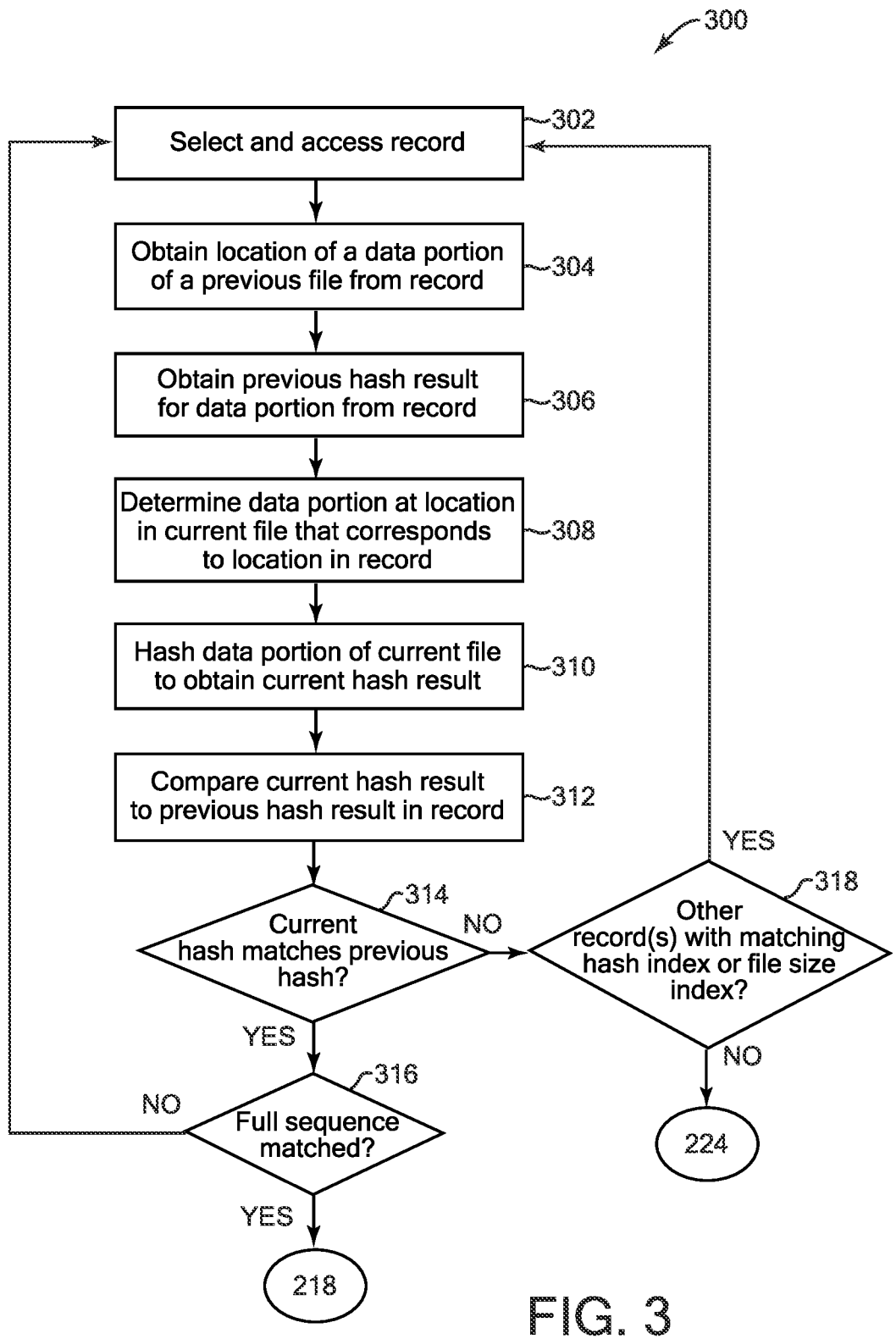
FIG. 3 is a flow diagram of an example method to hash data portions of a file and compare hash results to previous hash results in records of a data structure to determine whether the file matches a sequence of records, in accordance with some implementations.

FIG. 3 is a flow diagram illustrating a method 300 to hash data portions of a current file and compare hash results to previous hash results in records of a data structure to determine whether the current file matches a sequence of records, according to some implementations. In some implementations, method 300 can be used to implement blocks 214 and/or 216 of method 200 of FIG. 2, in which a sequence (e.g., path) of multiple records in a data structure is accessed to determine locations of data portions in a current file and to compare hashes of the data portions to corresponding previous hash results stored in the records (block 214) and it is determined whether the current hash results match the previous hash results for a full sequence of records (block 216).

Figure 5:
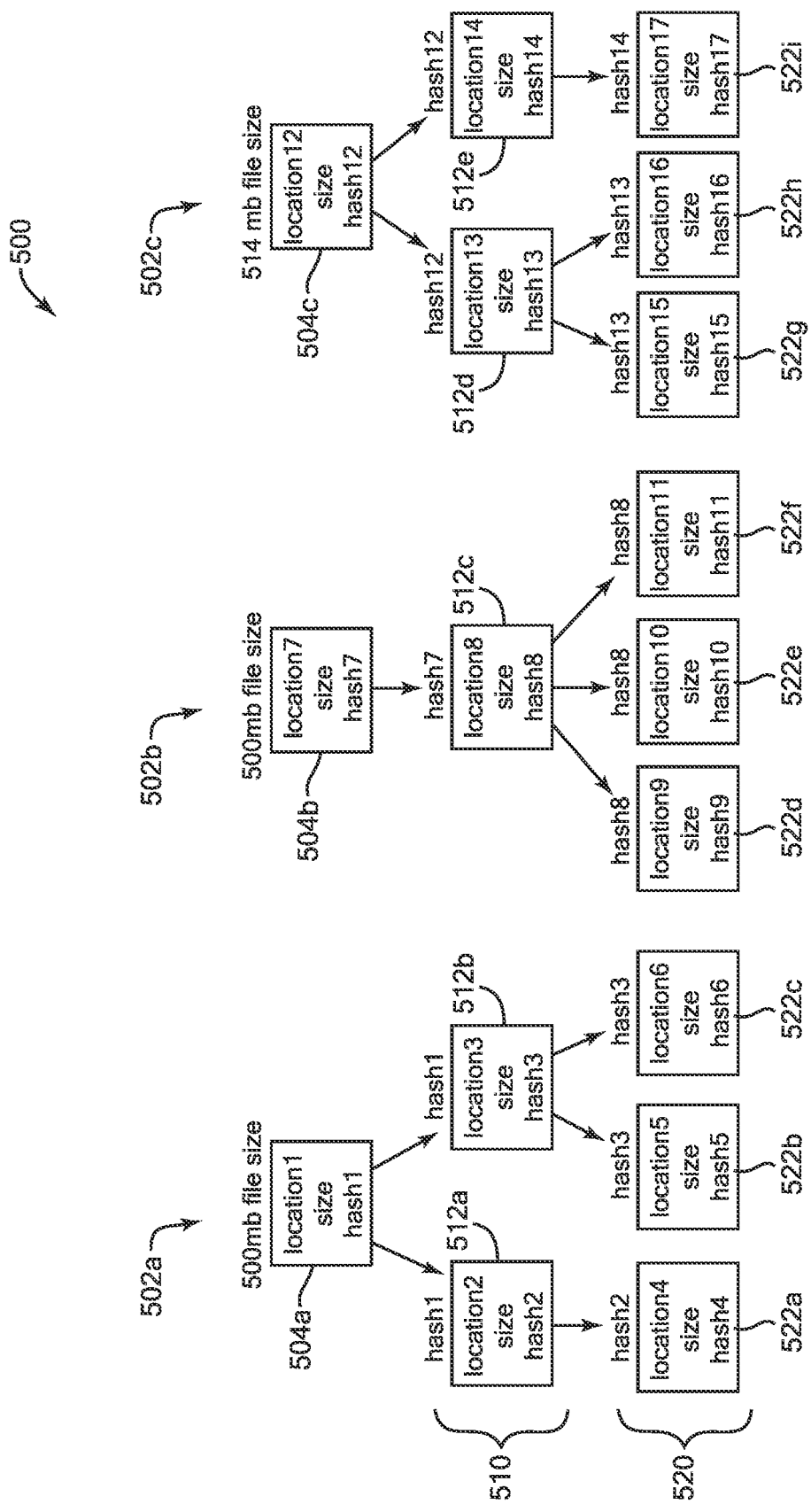
FIG. 5 is a diagram of an example data structure that can be used for one or more described features, in accordance with some implementations.

As described with reference to FIG. 2, method 300 can be initiated after finding one or more records in the data structure that are indexed based on the file size of the current file. In some implementations, the data structure can include multiple trees or tables, each tree or table associated with a respective file size. For example, the first level (or top) of each tree can be a record that is indexed based on file size. Some examples of trees are shown in FIG. 5. Similarly, the first record of each row of a table can be indexed based on file size.

Method 300 may begin at block 302. In block 302, a record is selected and accessed in the data structure. If it is the initial iteration of method 300, then an initial matching record of a sequence is selected and accessed in block 302. In some implementations, the initial record can be the first level of a tree or table row of the data structure. For example, the initial record can have an index that is a file size that matches the file size of the current file. In some cases, e.g., in later iterations of method 300 for the current file, the record accessed in block 302 can be a record in a sequence (e.g., located at a lower hierarchical level of a tree or table) that is indexed based on the hash result of a previous record in the sequence, as described in greater detail below. In some cases, in one or more later iterations of method 300 for the current file, the record accessed in block 302 can be an initial record of another tree or table row, e.g., indexed based on matching file size, after finding a non-matching record in a different tree or row. In some implementations, the record accessed in block 302 can be a record that has not been previously accessed in an earlier iteration of method 300 for the current file and is at the same hierarchical level of a different record that did not match the current file in a previous iteration. Block 302 can be followed by block 304.

In block 304, a location of a data portion of a previous file is obtained from the record accessed in block 302. The previous file is a file that was obtained and processed by the endpoint device previously, which had the same file size as the current file. The location of the data portion can be, for example, a starting address of a data portion in the previous file, an offset from the start of the file, etc. In some implementations, the location can be dependent on file type, endpoint type, or other factors that can be determined without reading the full contents of the file. In some implementations, the data portion can be implemented as one or more file blocks of a file system (or other system), or can be implemented as other portions of data. In some implementations, additional information can also be obtained from the record, e.g., the size of the data portion. In some examples, the size can be indicated as one or more file blocks or other types of data portions.

In some implementations, the size of the data portion can be a default or standard size, or can be obtained from another source, e.g., from parameters or settings provided by a process or store on the endpoint device (and/or can be configurable by a user). In some implementations, the size of the data portion can be variable and based on any of various factors. For example, the factors can include one or more characteristics or type of the endpoint device implementing method 200 (e.g., a standard file block size or minimum block size used for the endpoint device, processing capability, storage capability, functionality in a network etc.) and/or similar characteristics of one or more other devices in communication with the endpoint device. In some implementations, the factors can include the number of records designated to constitute a full sequences. In some implementations, the size of the data portion can vary in different sequences of records in the data structure, e.g., based on characteristics of the previous file and current file. In some examples, the size of the data portion can be based at least partially on a network packet size of the network providing the current file to the endpoint device, and/or based on network access cache size of the endpoint device. In some examples, the size of the data portion can be based at least partially on the amount of security desired for the endpoint device and/or potential security threats to the endpoint device. Block 304 can be followed by block 306.

In block 306, a previous hash result is obtained from the record accessed in block 302. The previous hash result is a result of previously hashing the data portion of the previous file that started at the location in the previous file indicated in block 304. In some implementations, additional information can also be obtained from the accessed record, e.g., an identification of the hashing algorithm or technique that was used to obtain the hash result stored in the record. In some examples, hashing algorithms that can be used include those of the Secure Hashing Algorithm (SHA) family of hashing algorithms, and/or other types of hashing algorithms. In some implementations, the hashing algorithm can be selected based on hardware efficiency and/or risk factors of the endpoint device and/or other devices and parameters of the network environment. Block 306 can be followed by block 308.

In block 308, a data portion of the current file is determined at a location in the current file that corresponds to the location obtained from the record in block 304. In some examples, each location in a file can refer to offset (e.g., in bytes) from the start of the file. For example, if the obtained location indicates a particular file block in the previous file, a corresponding file block in the current file is determined. If a size of the data portion is specified in the record, the data portion of the current file is provided a corresponding size. Block 308 can be followed by block 310.

In block 310, the data portion of the current file as determined in block 308 is hashed to obtain a current hash result (hash value). The hashing algorithm or technique used is the same hashing algorithm or technique that was used previously to obtain the previous hash result in the record. Any of various well known hashing techniques or algorithms can be used. Block 310 can be followed by block 312.

In block 312, the current hash result is compared to the previous hash result obtained from the record. Block 312 can be followed by block 314.

In block 314, it is determined, based on the comparison of block 312, whether the current hash result matches the previous hash result obtained from the record. If the current hash result does not match the previous hash result, then the current sequence of records does not match the current file. In this case, the method continues to block 318, described below.

If in block 314 the current hash result matches the previous hash result in block 314, then the method continues to block 316, in which it is determined whether the full sequence of records has been matched. In some implementations, it can be determined if the full sequence is matched by determining the number of records that have been matched in the current sequence. In some examples, the target number of matched records to qualify as a full sequence can be a default number, e.g., 15 or 20. In some implementations, the target number of records can be increased if greater security is desired, at the cost of additional processing requirements. In various implementations, the target number of records can be based on various factors. For example, in some implementations the target number can be based on a percentage factor, e.g., the number of iterations (e.g., an iteration can be blocks 302 to 312) needed to process a particular percentage of the data of the current file, given a particular size of data portion (e.g., block size). For example, the target number can be 20 if it takes 20 iterations to hash 10% of the data of the current file. The target number of records can also or alternatively be based on other factors, e.g., the size of the data portion that is hashed. In some implementations, the target number can vary for different received files, e.g., based on file size and/or other characteristics of a file. In some implementations, the target number of records in a sequence can be configurable by the endpoint device or by a user, e.g., to reduce processing time, provide greater security, etc. In some implementations, it can be determined or confirmed whether the full sequence has been matched by determining if there is another record in the current sequence, e.g., determining whether the accessed record points to another record in the sequence.

If it is determined in block 316 that the full sequence of records has not been matched (e.g., the number of matched records is less than the target number), then the method continues to block 302 to select and access another record in the sequence in the data structure. In some implementations, this accessed record can be the at the next hierarchical level of the tree or table row in which the previous matched records of the sequence are located. In some examples, an initial record can be indexed based on file size, and the following records in the sequence can be indexed based on the hash result stored in the previous record of the sequence. Thus, the previous hash result obtained in block 306 (or the current hash result of block 310) can be used to search for a matching index of a record at the next hierarchical level of the data structure (or elsewhere in the data structure). One or more records have an index that is the matching hash result, and one of these records is selected for access in block 302 (after block 316) as the next record in the sequence. In some implementations, if there are no more matching records in the data structure after a negative result of block 316, then the method can continue to block 318, described below.

If it is determined in block 316 that the full sequence of records have been matched, then the method continues to block 218 of method 200 of FIG. 2, in which the identity of the current file is considered to be verified, a file reference for the current file is created and stored, and (in block 220) file information associated with the current file is obtained and used, as described above with reference to FIG. 2.

Returning to block 314, if the current hash does not match the previous hash, then the method continues to block 318, in which it is determined whether there are one or more other records in the data structure that have a matching hash index or a matching file size index to the current file, and which have not yet been accessed in the iterations of method 300 for the current file. In some implementations, if one record at a particular hierarchical level does not have a matching hash result to the current file, then one or more other records at that same hierarchical level of the mismatched record are searched for an appropriate index. In some examples, in a case where the initial record of a tree or table row did not have a matching hash value, other records (not yet accessed) can be searched at the first hierarchical level (e.g., initial records of other trees or table rows) for a file size index that is the file size of the current file. In another example, in a case where a later record of a data structure does not have a matching hash value (e.g., at a lower hierarchical level of a tree or table), other records (not yet accessed) can be searched at the same hierarchical level of the mismatched record for a hash index that is the hash result of the previous record in the sequence. If there are no other records at the same hierarchical level as the mismatched record, then other records (not yet accessed) can be searched at the first hierarchical level for an index that is the file size of the current file. In some implementations, the search starts again at the highest hierarchical level (e.g., that are indexed by file size) after any mismatch of hash values, e.g., regardless of the hierarchical level of the mismatched record.

If it is determined in block 318 that there are one or more other records with a matching hash index or file size index and not yet accessed, then the method continues to block 302 to select one of those records and access the selected record. As described above, in some example cases, the accessed record can be at the same hierarchical level of the tree or table as the mismatched record, and in some other example cases, the accessed record can be at the highest hierarchical level in a different tree or table row than the mismatched record.

In some implementations, a cache mechanism can be used during method 300 to store, in a cache, hash results that are determined in method 300 (and method 200) for the current file, and where the cache can be accessed in relevant later iterations to reduce processing time if the same data portion of the current file is to be hashed. For example, a cache entry of a cache can be associated with each record in the data structure. In some examples, in one iteration of method 300, a hash result of a data portion of the current file is determined in block 310 and stored in the cache (and the size of the data portion can also be stored). This hash result does not match the previous hash result of the record as determined in block 314. In a later iteration, in some implementations, the same tree is traversed to access a different record, such that one or more of the same records that were previously accessed are again accessed before reaching the different record; or a different table row can be accessed, e.g., which has one or more same records as previously accessed before reaching a different record. When a same record is accessed as in a previous iteration (and the data portion size matches), the hash result for the current file can be obtained from the cache entry associated with that record instead of hashing the data portion of the current file, thus avoiding a repeat of hashing the same data portion of the current file. In some implementations, the cache can be maintained at least during method 200, e.g., until block 214 or 222 is performed at which point no further hashing of the current file is needed; or the cache can be maintained for a longer duration.

In some implementations, accesses of records in the data structure in method 300 can be performed according to a predetermined sequence, e.g., starting from a highest hierarchical level in a data structure and advancing to each successive hierarchical level, or along a particular path of records in a graph data structure that does not have hierarchical levels. In some implementations, one or more accesses of records in method 300 can be an arbitrary sequence or randomized sequence instead of being performed according to a predetermined sequence. For example, the order of access of the sequence of records in the data structure can be any arbitrary order, or a random order, which finds and matches each record of the full sequence and verifies the identity of the current file when the target number of hashes match for a full sequence. In some implementations, when a sequence of hashes is created, a full sequence of records is created for different data portions in the file and the sequence of records is randomized in locations in the data structure. In some implementations, this random or arbitrary order of access may provide greater security, e.g., to prevent a third party from replaying a predetermined order of records to spoof results.

In some examples, a random or arbitrary location at which to start the access of the records in the data structure can include, e.g., a bottom-level record of a tree or table rather than a top-level record, and/or the access order can be from the bottom level up to the top level. In data structures that are a graph of records (e.g., without hierarchical levels), a random access can be at any location in the data structure. In some implementations, if a current hash result does not match a stored previous hash result for an accessed record, another matching hash index can be searched in the current file size tree or table, e.g., search for a different random or arbitrary (and not previously accessed) record in the data structure at the same hierarchical level until a match is found. Then, records of a different arbitrary or random hierarchical level can be searched to find another matching record. Different hierarchical levels of a data structure (e.g., tree or table) can be searched to find further matches, or various different records of a list or graph data structure can be searched in the randomized order. In a graph data structure having no hierarchical levels, any record in the data structure can be accessed to determine if the hash of the record matches, then any other record can be accessed, and so on. Since a large number of records could be accessed, the cache mechanism described above can be used to store previously-determined hash results so that the same hashing operations are not repeated. In some implementations, the order of access of records can be predetermined or random as selected by the endpoint device or user based on one or more factors (e.g., available cache, processing capability of the endpoint device, etc.).

Figure 4:
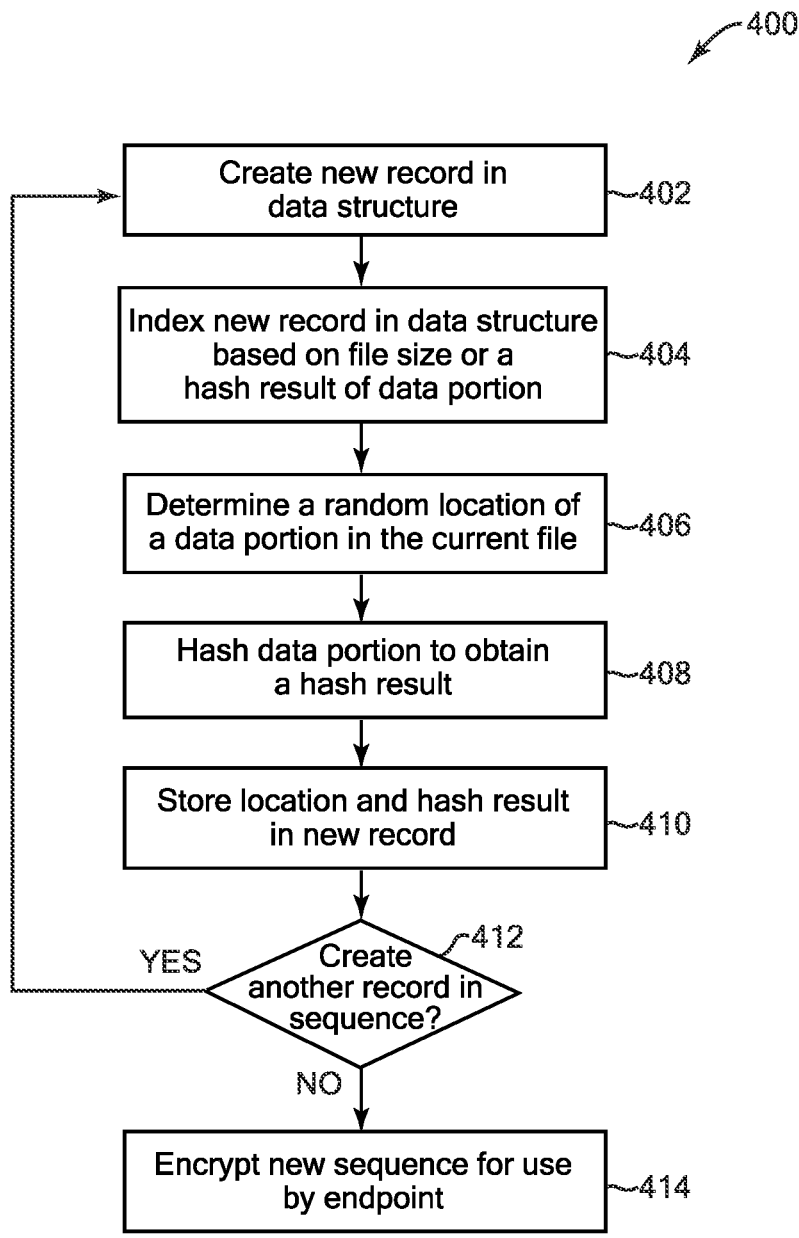
FIG. 4 is flow chart of an example method to create a sequence of new records in a data structure for files that do not match existing records, in accordance with some implementations.

FIG. 4 is a flow diagram illustrating a method 400 to create a sequence of new records in a data structure for a file that does not match existing records, according to some implementations. In some implementations, method 400 can be used to implement block 224 of method 200 of FIG. 2, in which one or more new records are created in a data structure in response to not finding a matching full sequence of records in the data structure.

Method 400 may begin at block 402. In block 402, a new record is created in the data structure. In some implementations, the data structure includes one or more sequences of records. In some implementations, the data structure includes one or more trees or table rows, e.g., each tree, table, or group of one or more table rows being associated with a file size, or according to a different configuration. In some implementations, a tree can be implemented as shown in the example of FIG. 5, described below. In some examples, one or more trees can be implemented as a table, e.g., having N rows of records, where each row is a record sequence (e.g., a path through a tree) that includes a number of records up to the target number, and each further record in a row is at a next hierarchical level; for example, a tree can be represented by multiple table rows. In some implementations, the new record can be created in the data structure at the hierarchical level at which a mismatched record was found. In an example, if the mismatch is due to not finding a matching file size in the data structure (e.g. as in block 206 of FIG. 2), or if the current hash result did not match the previous hash results of any first records at that file size, then the new record can be created at a highest level of the data structure to start a new sequence of records (e.g., a new tree, branch in a tree, or new table row of a record sequence). In another example, if the mismatch is due to current hash results not matching previous hash results stored in an accessed record, and if one or more records of a particular branch in the tree or table row matched the current file (e.g., at earlier hierarchical levels of the branch or table row than the level of the mismatch), the new record can be created at the same hierarchical level of the mismatched record, e.g., in the same tree or in a new table row that has the same matching records at earlier levels. In some examples, in a sequence through a tree, the first two records of the sequence have matching hash results at the first and second hierarchical levels of the tree. At a third hierarchical level, all of the third-level records in the tree do not match current hash results. In some examples, the new record can be created at the third hierarchical level in this tree which had the mismatches. In this example, the existing records in the tree at the first and second hierarchical levels provide the initial part of a new sequence of records, and the newly-created record continues the new sequence. Block 402 can be followed by block 404.

In block 404, the new record is indexed in the data structure based on the file size of the current file, or based on the hash result of the data portion in the current file that had no matches with appropriate records in the data structure. For example, if no matching file size was found for the index of any initial record of the data structure, then the new record is a first-level or initial record and is provided an index that is the file size of the current file. In another example, if a hash result of the current file did not match a previous hash result in any accessed record of a tree or table row at the farthest-reached hierarchical level, then the new record can be provided an index that is the file size of the current file (if the new record is at the first hierarchical level of the data structure) or can be provided an index that is the previous hash result from the immediate previous record in a sequence of records accessed for the current file. For example, the new record could be accessed for a future received file that matches a sequence of records in the data structure that includes the new record. Block 404 can be followed by block 406.

In block 406, a random location of a data portion in the current file is determined. For example, the random location can be a random offset from the beginning of the current file, a random start address, or other random location. Determining a random location for the data portion provides an unpredictable location for the data to be hashed that cannot be easily compromised by malicious operations. In some implementations, randomization of the location can be biased or weighted so that the sequence of records, in which the new record is included, has hash results of data portions that are spread over the entire data of the current file and not concentrated in one portion of the current file.

In some implementations, a size of the data portion can also be determined in block 406. In some implementations, the data portion size can be a standard or default size, can be based on system settings or user-specified settings, or can be a random size (within specified limits or other parameters), similarly as described above. Block 406 can be followed by block 408.

In block 408, the data portion in the current file that is located at the location determined in block 406 (and/or having the size determined in block 406) is hashed using a hashing technique to obtain a hash result. For example, the hashing technique can be a standard technique, or can be selected based on one or more characteristics of the current file (e.g., file size, the location in the file, etc.). Block 408 can be followed by block 410.

In block 410, the location determined in block 406 and the hash result determined in block 408 are stored in the new record. In some implementations, the size of the data portion is also stored in the new record. In some implementations, an indication of the hashing technique used to hash the data portion in block 408 is also stored in the new record. Block 410 can be followed by block 412.

In block 412, it is determined whether to create another new record in the sequence of records. The additional new record follows the new record that was created in block 402 of the same iteration of method 400. In some implementations, a target number of records are provided to create a full sequence. If the sequence does not include the target number of records, then another record is to be created. If the sequence includes the target number of records, then no more records are to be created. In some implementations, the target number of records in a full sequence can vary based on one or more factors, e.g., as described above with reference to block 316 of FIG. 3. In various implementations, the target number of records is the same for all received files, such that the number of hierarchical levels in each sequence (e.g., tree branch or table row) of the data structure is the same; or the target number of records (and number of hierarchical levels in data structure) can vary for different received files (e.g., vary based on file size).

If another record is to be created in the sequence as determined in block 412, the method continues to block 402 to create a new record. For example, the new record can be at the next lower hierarchical level after a record just previously created, and can be indexed based on the hash result stored in the record just created, similarly as described above. If another record is not to be created in the data structure as determined in block 412 (e.g., the sequence has the target number of records), then the method continues to block 414, where, in some implementations, the new sequence of records is encrypted for use by the endpoint device. For example, the sequence of records can be encrypted to be accessed only with a key that is stored on the endpoint device performing methods 200, 300, and 400. The data structure thus cannot be used by a different device than the endpoint device, preventing malicious use of the data structure. In some examples, the sequence of records is encrypted with a symmetric key. Other types of encryption can be used in other implementations that prevents use of the data structure (including the new records created in method 400) on other devices.

In some implementations, the data structure of records can be a graph data structure. In some implementations, the graph does not have hierarchical levels, or can have a single top level of records indexed based on file size and no hierarchical levels after that level. In some examples, the graph includes records that can each have a connection to a next record in the sequence of records via a hash result index, similarly as described herein for trees or tables. For example, a new record can be added to the graph by including the hash result of the previous record in an index field of the new record. When the graph is searched for a full sequence of records (e.g., as in the method of FIG. 3), to find the next record in a sequence, any other record of the graph can be searched for a matching hash index or file size index (e.g., in block 318 of FIG. 3).

In various implementations, various blocks of methods 200, 300, and/or 400 may be repeated, combined, split into multiple blocks, performed in parallel, performed asynchronously, or performed periodically. In some implementations, one or more blocks of methods 200, 300, and/or 400 may be repeated, may not be performed, or may be performed in a different order than shown in FIGS. 2, 3, and 4. Methods 200, 300, and/or 400, or portions thereof, may be repeated any number of times using additional inputs, e.g., when a file is received by an endpoint device.

FIG. 5 is a diagrammatic illustration of an example data structure 500 that can be used for one or more features described herein, according to some implementations. In FIG. 5, a letter after a reference number, e.g., "502*a*," represents a reference to the element having that particular reference number. A reference number in the text without a following letter, e.g., "502," represents a general reference to implementations of the element bearing that reference number.

An example data structure that can be used for features described herein can include multiple trees, each tree associated with a respective file size. In some implementations, each tree can be implemented as a table, e.g., having rows of records where each row is a record sequence having a number of records up to the target number, and each further record in a row is at the next hierarchical level. The example of FIG. 5 shows three trees 502 of data structure 500. As described herein, in some implementations an initial record of the data structure can be accessed based on the file size of an obtained current file. An initial record 504 of each tree 502 is indexed by a file size as shown. The file sizes that exist in the tree are for files that have been previously received by the endpoint device that implements data structure 500, and for which records have been created in data structure 500, e.g., based on the method 400 of FIG. 4.

Each initial record 504 includes information related to a previous hash performed on a data portion of the previous file. The information can include, as shown, a location of the data portion hashed, a size of the data portion hashed, and the hash result from the hash (here labelled as "location1", "location2", "hash1," "hash2," etc., where the number indicates a particular location or hash result that is different from locations or hash results associated with a different number).

In this example, two initial records 504a and 504b are the first records of two different trees and have the same indexes based on file size. This can indicate that that multiple previous files received by the endpoint device had the same file size, but at least one previous file did not provide a hash result that matched the previous hash result stored in the existing initial record, and a new initial record was created for that file as described above with reference to FIG. 4.

Each tree 502 can have a number of hierarchical levels at which additional records can be stored. In a second hierarchical level 510, records 512 are stored which have indexes that are the previous hash results stored in their parent records. Records 512 each store a location, size, and hash result, where the locations and hash results are different (size can also be different in some implementations). Each child record of a parent record stores a different location of a data portion that was hashed, and a different hash result associated with the data portion at that location. Multiple child records from a single parent record can indicate that previous files received by the endpoint device had the same hash result of the parent record, but did not all have the same hash result in existing child records, and a new child record was created for each such file as described above with reference to FIG. 4.

Similarly, in a third hierarchical level 520, records 522 are stored which have indexes that are the previous hash results stored in their parent records. Each record 522 stores a location, size, and hash result, where the locations and hash results are different from other records. As with the records 512, multiple child records 522 branching from a single parent record 520 can indicate that one or more previous files did not provide hash results matching existing parent records 520 and so new child records 522 were created for those files.

A current file that produces current hashes that match previous hashes in a full sequence of examined records of the data structure can be considered to have its identity verified and is the same file as the previous file that produced the full sequence of records in the data structure. In an example, tree 502a has three hierarchical levels, and a first current file matches the file size of tree 502a (e.g., 500 MB). The records 504a, 512b, and 522b are accessed in a sequence through the tree 502a, where hash results produced by the data portions in the first current file at locations indicated in records 504a, 512b, and 522b match the respective stored previous hash results in those records (hash1, hash3, and hash 5, respectively), and since the target number of records for a full sequence is three, the first current file's identity is considered verified to be the same as the previous file that created this sequence.

In another example, a second current file matches the file size of the initial record 506a of tree 502a and produces a hash result that matches the previous hash result (hash1) stored in record 504a. The method then searches for a record at the next hierarchical level 510 that has an index that is the previous hash result (hash1), and finds records 512a and 512b that have such an index. Selecting record 512a, the data portion of the current file at the location in record 512a (location2) is hashed but does not match the previous hash result (hash2) stored in record 512a, so record 512b is selected. The current hash result derived from the location in record 512b (location3) matches the previous hash result (hash3) in record 512b, so the next hierarchical level 520 is searched for a next record in the sequence that has an index that is the previous hash result of record 512b (hash3). Two records 522b and 522c are found that have the desired index, and record 522b is selected and accessed. The corresponding current hash result does not match the previous hash result (hash5) stored in record 522b, and so record 522c is selected and accessed. The corresponding current hash result is found to match the previous hash result (hash6) stored in record 522c. Since the second current file matches the sequence of records 504a, 512b, and 522c, and the target number for a full sequence is three for this example, the identity of the second file is considered verified to be the same as the previous file that created this sequence.

In another example, assuming that tree 502b does not yet exist in the data structure and that the data structure has three hierarchical levels, a third current file matches the file size associated with the initial record 504a of tree 502a but produces a hash result that does not match the previous hash results (hash1) stored in record 504a. A search for another initial record having the same file size does not find any matches, so the third current file is considered unverified in its identity. A new tree is created since no matching records are found at the first level of the data structure. For example, a new initial record 504b is created which has the file size of the third current file as its index. A random data portion in the third current file, and its hash result, are determined and stored in record 504b. New records 512c and 522d are created in sequence after record 504b, where hash results "hash8" and "hash9" of random data portions in the third current file are stored in the created records 512c and 522d, respectively.

In an extension of this example, a fourth current file is received having the same file size and provides hash results that match the respective hash results in records 504b and 512c, but does not produce a match for the hash result ("hash9") in record 522d. Therefore, the fourth current file is considered unverified in its identity. A new record 522e is created at the same hierarchical level as the unmatched record 522d, such that the sequence of records (e.g. branch of tree 502b) for the fourth current file is record 504b, record 512c, and record 522e. A similar process for a fifth current file causes a new record 522f to be created at the same hierarchical level.

Figure 6:
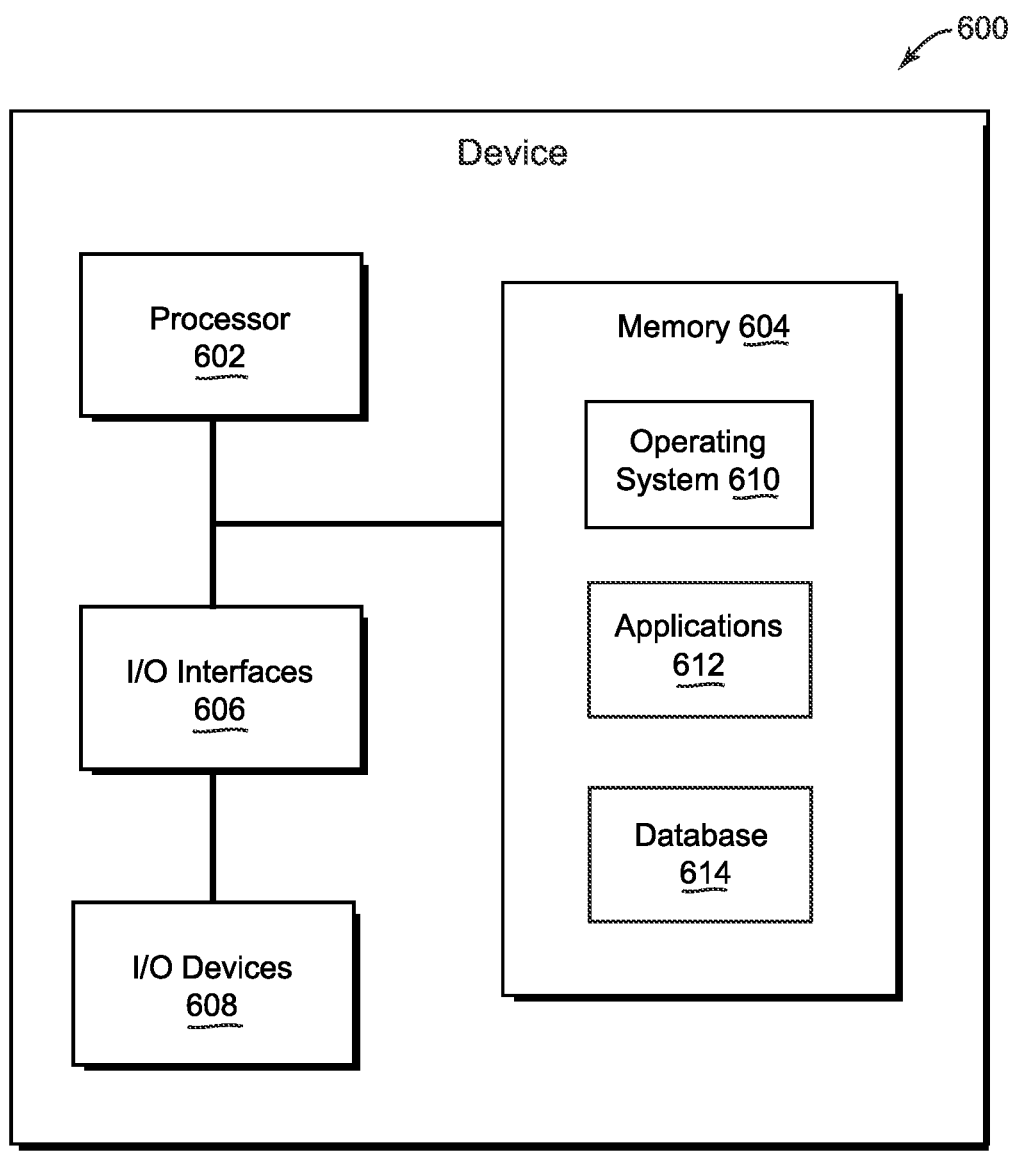
FIG. 6 is a diagram of an example computing device which can be used to implement one or more features described herein, in accordance with some implementations.

FIG. 6 is a diagram of an example computing device 600 which may be used to implement one or more features described herein, in accordance with some implementations. In some examples, device 600 may be used to implement an endpoint device, e.g., endpoint device 112 shown in FIG. 1. Device 600 can be any suitable computer system, server, or other electronic or hardware device. For example, device 600 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). Device 600 includes one or more processors 602, nontransitory computer readable medium or memory 604, input/output (I/O) interfaces 606, and I/O devices 608, all of which may be operatively coupled to each other by a bus.

Processor 602 can be one or more processors and/or processing circuits to execute program code and control basic operations of the device 600. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 602 may include one or more co-processors that implement neural-network processing. A processor may perform its functions in "real-time," "offline," in a "batch mode," etc. A computer may be any processor in communication with a memory.

Memory 604 is typically provided in device 600 for access by the processor 602, and may be any suitable computer-readable (processor-readable) storage medium, such as random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can include any other type of storage (magnetic disk, optical disk, magnetic tape, or other tangible media) and can be considered "storage" or "storage devices."

Memory 604 can store software operating on the device 600 by the processor 602, including an operating system 610, applications 612, and database(s) 614. Applications 610 can include a security agent that can include instructions that enable processor 602 to perform one or more techniques described herein, e.g., the methods of FIGS. 2, 3, 4, and/or 5. Applications 612 can include other threat detection or security applications, networking or communication applications, etc. Database 614 can include one or more databases, data structures (trees, tables, graphs, etc.), etc., that can store device information (e.g., device type, operating system, version number, etc.), data structures of records as described herein, file information related to files received by the device 600, security threat information, received network data, lists of rogue malware and URLs, etc., or any other data used in features described herein.

In operation, processor 602 may execute applications 612 stored in memory 604. Applications 612 may include software instructions that, when executed by the processor, cause the processor to perform operations for verifying an identity of a file in accordance with the present disclosure (e.g., performing one or more of the operations described with reference to FIGS. 2, 3, 4, and/or 5). Application program 612 may operate in conjunction with the database 614 and the operating system 610.

I/O interfaces 606 can provide functions to enable interfacing the device 600 with other systems and devices. Interfaced devices can be included as part of the device 600 or can be separate and communicate with the device 600. Device 600 can communicate with other devices (e.g., an endpoint device, a firewall, a wireless access point, or a threat management system) via the I/O interfaces 606. For example, local or remote network and/or wireless communication devices, storage devices (e.g., memory and/or database), and input/output devices can communicate with processor 602 and memory 604 via I/O interface 606.

I/O devices 608 can connect to I/O interfaces 606 can include a variety of types of devices, including one or more display devices that can be used to display information, e.g., text, images, video, and/or a user interface of applications 612. A display device can be connected to device 600 via local connections (e.g., display bus) and/or via networked connections and can be any suitable display device, e.g., LCD, LED, or plasma display screen, CRT, television, monitor, touchscreen, 3-D display screen, or other visual display device. A display device may also act as an input device, e.g., a touchscreen input device. The display device can be a flat display screen provided on a mobile device, multiple display screens provided in glasses or a headset device, or a monitor screen for a computer device. I/O devices 608 can also include various other devices such as input devices (keyboard, pointing device, touchscreen, microphone, camera, scanner, sensors, etc.) and/or output devices (speaker devices, printers, motors, etc.).

For ease of illustration, FIG. 6 shows one block for each of processor 602, memory 604, I/O interfaces 606, and I/O devices 608. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While some components are described as performing blocks and operations as described in some implementations herein, any suitable component or combination of components of environment 100, device 600, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer-readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

It will be appreciated that the modules, processes, systems, and sections described above may be implemented in hardware, hardware programmed by software, software instructions stored on a nontransitory computer readable medium or a combination of the above. The instructions may be compiled from source code instructions provided in accordance with a programming language such as Java, C, C++, C #.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus.

Furthermore, the steps, modules, processes systems, and sections (or their sub-components or modules) may be implemented as a single processor or as a distributed processor (single and/or multi-core, or cloud computing system). The methods, modules, processors, systems and computer readable media (or computer program product) described herein may be implemented as a programmed general purpose computer, a special-purpose computer, an integrated circuit device, a programmed microprocessor or microcontroller and peripheral integrated circuit element, a semiconductor chip, a network server or switch, an ASIC or other integrated circuit, a digital signal processor, a hard-wired electronic or logic circuit such as a discrete element circuit, a programmed logic circuit such as a PLD, PLA, FPGA, PAL, an electronic device programmed with microcode, a hard-wired analog logic circuit, software stored on a computer-readable medium or signal, an optical computing device, a networked system of electronic and/or optical devices, and/or a software module or object stored on a computer-readable medium or signal, for example. In general, any processor capable of implementing the functions or steps described herein may be used to implement implementations of the method, system, or a computer program product (software program stored on a nontransitory computer readable medium).

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

It should be noted that there may be information collected about compute instances and users, and this may have privacy implications and scalability implications. Privacy may be addressed in some cases by user notifications and permissions, anonymization, tokenization, and encryption. It may also be useful to optimize the network data being collected or analyzed by one or more of coalescing the data, compressing the data, or serializing the data. Security features may be used to avoid abuse of APIs (e.g., authentication, replay protection, DoS protection). Performance optimizations, such as rate limiting, prioritization, and queue management may be used to improve scalability.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," or the like) provided herein, is intended merely to better illuminate the implementations and does not pose a limitation on the scope of the implementations. In the description, it is understood that terms such as "first," "second," "top," "bottom," "up," "down," and the like, are words of convenience and are not to be construed as limiting terms. No language in the specification should be construed as indicating any unclaimed element as essential to the practice of the implementations.

While the disclosed subject matter has been described with respect to a number of implementations, these particular implementations are merely illustrative, and not restrictive. It is evident that many alternatives, modifications and variations would be, or are, apparent to those of ordinary skill in the applicable arts. Features illustrated in the examples can be embodied in many different forms and may be applied to other examples and implementations.

What is claimed is:

1. A computer-implemented method comprising:
   determining, by one or more processors, a size of a particular file received by an endpoint device;
   searching for a record indexed in a data structure by searching for a size value index of the record that corresponds to the size of the particular file, the data structure stored on the endpoint device; and
   in response to finding the record indexed in the data structure:
      accessing a sequence of records in the data structure, the sequence including multiple records starting from the record, and for each respective record of the multiple records:
         hashing a respective particular data portion of the particular file that has a location in the particular file that corresponds to a location parameter in the respective record to obtain a respective particular hash result; and
         determining whether the respective particular hash result matches a corresponding respective previous hash result stored in the respective record, wherein the respective previous hash result is based on a respective associated data portion in an associated file at a location in the associated file that is indicated by the location parameter; and
      in response to determining that the respective particular hash results match the corresponding respective previous hash results of the multiple records, determining that the particular file is the same as the associated file, obtaining file information previously determined for the associated file, and determining one or more characteristics of the particular file at the endpoint device using the file information.

2. The method of claim 1, further comprising:
   in response to determining that a particular hash result in the sequence is different than the corresponding previous hash result, searching for another record indexed in the data structure by searching for a size value index of the other record that corresponds to the size of the particular file or based on a matched hash result in a previous record of the sequence.

3. The method of claim 1, wherein each subsequent record in the sequence after the record is indexed based on a respective previous hash result in a previous record of the sequence.

4. The method of claim 1 wherein hashing the respective particular data portion includes storing the respective particular hash result in a cache that is available for later hashes of the respective particular data portion.

5. The method of claim 1, wherein the location parameter in the respective record indicates the location in the associated file that is randomly determined by the endpoint device when the record was created and the associated file was obtained by the endpoint device, such that the sequence of records stores hash results obtained from randomly-located data portions within the associated file.

6. The method of claim 1, wherein a total size of the respective particular data portions is less than the size of the particular file such that an amount of data in the particular file that is hashed is less than all data in the particular file.

7. The method of claim 1, wherein the sequence includes a predetermined number of records, wherein the predetermined number is configurable by the endpoint device.

8. The method of claim 1, wherein the sequence is based on a predetermined order of the multiple records in the data structure.

9. The method of claim 1, wherein the sequence is based on accessing a randomly-determined order or arbitrary order of the multiple records in the data structure.

10. The method of claim 1, further comprising combining the respective particular hash results to create a file reference for the particular file for use by processes executing on the endpoint device.

11. The method of claim 1, wherein determining the one or more characteristics of the particular file at the endpoint device includes determining a security status of the particular file that indicates whether the particular file is at least one of: malicious, potentially malicious, or benign.

12. The method of claim 1, further comprising, in response to not finding any record indexed in the data structure based on the size of the particular file or not finding any record in the data structure in which the respective particular hash result matches a corresponding respective previous hash result, applying a threat detection process to the particular file.

13. The method of claim 1, further comprising:
in response to not finding any record indexed in the data structure by searching for the size value index or not finding any record in the data structure in which the respective particular hash result matches a corresponding respective previous hash result:
creating a new record in the data structure, the new record being indexed with the size value index that corresponds to the size of the particular file when the new record is an initial record in a new sequence, or indexed based on the respective previous hash result in a previous record in the sequence previous to the new record when the new record is subsequent to the previous record in the sequence;
determining a new location of a new data portion in the particular file;
hashing the new data portion to obtain a new hash result; and
storing the new location and the new hash result in the new record.

14. The method of claim 13, further comprising:
creating a predetermined number of additional records in the sequence at successive hierarchical levels of the data structure after the new record;
determining, for each additional record, a different respective additional location of a respective additional data portion in the particular file;
hashing, for each additional record, the respective additional data portion to obtain a respective additional hash result; and
storing, in each additional record, the respective additional location and the respective additional hash result.

15. The method of claim 1, wherein the data structure is encrypted for use only on the endpoint device.

16. The method of claim 1, wherein each particular data portion has a size, and further comprising determining the size of the respective particular data portions based on one or more characteristics of the endpoint device that stores the data structure.

17. The method of claim 1, wherein searching for the record is performed in response to the size of the particular file being greater than a threshold file size, and further comprising:
in response to the size of the particular file being less than the threshold file size, hashing all data of the particular file to obtain a single hash result and comparing the single hash result to a single previous hash result for the associated file to determine if the particular file is the same as the associated file.

18. A device comprising:
one or more hardware processors; and
a memory coupled to the one or more hardware processors, with instructions stored thereon, that when executed by the one or more hardware processors, cause the one or more hardware processors to perform operations comprising:
determining a size of a particular file received by the device via a communication network;
searching for a record indexed in a data structure by searching for a size value index of the record that corresponds to the size of the particular file, the data structure stored on the device; and
in response to finding the record indexed in the data structure:
accessing a sequence of records in the data structure, the sequence including multiple records starting from the record, and for each respective record of the multiple records:
hashing a respective particular data portion of the particular file that has a location in the particular file that corresponds to a location parameter in the respective record to obtain a respective particular hash result; and
determining whether the respective particular hash result matches a corresponding respective previous hash result stored in the respective record, wherein the respective previous hash result is based on a respective associated data portion in an associated file at a location in the associated file that is indicated by the location parameter; and
in response to determining that the respective particular hash results match the corresponding respective previous hash results of the multiple records, determining that the particular file is the same as the associated file, obtaining file information previously determined for the associated file, and determining one or more characteristics of the particular file at the device using the file information.

19. The device of claim 18, wherein the execution of the instructions cause the one or more hardware processors to perform operations further comprising:
  in response to determining that the respective particular hash result is different than the corresponding previous hash result, searching for another record indexed in the data structure by searching for a size value index of the other record that corresponds to the size of the particular file or based on a matched hash result in a previous record of the sequence; and
  in response to not finding any record indexed in the data structure by searching for a size value index of the other record that corresponds to the size of the particular file or not finding any record in the data structure in which the respective particular hash result matches a corresponding respective previous hash result, applying a threat detection process to the particular file.

20. A non-transitory computer-readable medium with instructions stored thereon that, when executed by one or more processors, cause the one or more processors to perform operations comprising:
  determining a size of a particular file received by an endpoint device coupled to a communication network;
  searching for a record indexed in a data structure by searching for a size value index of the record that corresponds to the size of the particular file, the data structure stored on the endpoint device; and
  in response to finding the record indexed in the data structure:
    accessing a sequence of records in the data structure, the sequence including multiple records starting from the record, and for each respective record of the multiple records:
      hashing a respective particular data portion of the particular file that has a location in the particular file that corresponds to a location parameter in the respective record to obtain a respective particular hash result; and
      determining whether the respective particular hash result matches a corresponding respective previous hash result stored in the respective record, wherein the respective previous hash result is based on a respective associated data portion in an associated file at a location in the associated file that is indicated by the location parameter; and
    in response to determining that the respective particular hash results match the corresponding respective previous hash results of the multiple records, determining that the particular file is the same as the associated file, obtaining file information previously determined for the associated file, and determining one or more characteristics of the particular file at the endpoint device using the file information; and
  in response to not finding any record indexed in the data structure based on the size of the particular file or not finding any record in the data structure in which the respective particular hash result matches a corresponding respective previous hash result, applying a threat detection process to the particular file.

* * * * *